United States Patent
Marsh

[15] 3,704,785
[45] Dec. 5, 1972

[54] WATER SOFTENER DEFLECTOR-DISTRIBUTOR STRUCTURE

[72] Inventor: Robert E. Marsh, 12200 Montecito Road, Seal Beach, Calif. 92412

[22] Filed: Sept. 15, 1971

[21] Appl. No.: 180,738

[52] U.S. Cl. .................... 210/285, 210/288, 239/504
[51] Int. Cl. .............................................. B01d 23/10
[58] Field of Search....210/32, 35, 80, 275, 279, 285, 210/288, 289; 239/483, 504; 137/590, 592

[56] References Cited

UNITED STATES PATENTS

| | | | |
|---|---|---|---|
| 1,775,412 | 9/1930 | Tannehill | 210/191 |
| 2,447,135 | 8/1948 | Pick et al | 210/288 |
| 2,973,097 | 2/1961 | Snider | 210/279 |
| 3,317,044 | 5/1967 | Marks | 210/279 |

Primary Examiner—Samih N. Zaharna
Attorney—Fowler, Knobbe & Martens

[57] ABSTRACT

There is provided, in association with the collector-distributor tube of a water softener tank, a baffle or deflector member for conforming to an ideal pattern the distribution of liquid flowing from perforations at the perforated end of the tube that is immersed in a bed of ion-exchange resin in the tank. The deflector is positioned adjacent to the uppermost of the perforations in the tube and is apertured to permit some flow-through of liquid emerging from the tube through the perforations, while revertively deflecting a portion of the liquid to cause it to spread and flow generally uniformly through the bed of resin instead of channeling in close proximity to the tube in its flow toward the other end of the tank.

21 Claims, 5 Drawing Figures

PATENTED DEC 5 1972

INVENTOR.
ROBERT E. MARSH

BY
FOWLER, KNOBBE
& MARTENS
ATTORNEYS.

INVENTOR.
ROBERT E. MARSH

BY FOWLER, KNOBBE
& MARTENS
ATTORNEYS.

WATER SOFTENER DEFLECTOR-DISTRIBUTOR STRUCTURE

BACKGROUND OF THE INVENTION

Water softener units are comprised of a tank, usually elongated and standing vertically, containing a bed of exchanger resin, usually granular in form, filling the tank to a somewhat greater extent than 50% of its length. The tank is provided with a tube extending from the top of the tank downwardly through the bed of resin to the bottom of the tank and at the bottom the tube is perforated over a distance of several inches of its length. The tank is fitted at the top with a control head for controlling, by means of valves, the flow of water into and out of the tank. The upper end of the tube enters the control head and the valves are so arranged that water may be admitted directly into the tank, permitted to percolate through the bed of resin, enter the tube through the perforations at its lower end and be drawn off through the tube; or alternatively water may be admitted into the tube from the top, flow downwardly through the tube, emerge from the tube through the perforations at the lower end, rise upwardly through the bed of resin and be drawn off from the top of the tank. When the tank is performing a normal softening operation the water flow is as first described, the water entering the tank at the top, an exchange of ions taking place as the water percolates through the bed of resin and the softened water entering the tube at the bottom and being drawn off through the tube. When the bed of ion-exchange resin is spent, so that it is no longer capable of softening water a regenerating operation is performed, which involves a back flushing operation and the admission and withdrawal of brine to replace the insoluble compound ions that have been acquired by the resin bed with soluble compound ions.

When a collector-distributor tube answering to the above description is used an effect known as channeling is experienced, by which is meant that particularly when the tube is performing its function as a distributor, involving the admission of water into the tank through the tube, the water emerging from the perforations at the lower end of the tube tends to rise in close proximity to the tube, instead of spreading outwardly through the bed of resin, so that much of the bed does not participate in the regenerating process and portions of the bed remain spent. This means that the regenerating cycle must occur more frequently because of the inefficiency involved in the regenerating process. Also, when the tube is being used as a collector, which is the case when a softening operation is in process, the water entering the tank at the top and being drawn off through the tube, there is a considerable tendency for the water to flow in the pattern of an inverted cone, away from the wall of the tank and toward the tube. It follows from this that portions of the resin bed close to the wall of the tank which are in the regenerated condition and capable of performing the water softening function are not contacted effectively by flowing water and so are effective only when water is not being drawn through the tank and the tank is full of water.

Another disadvantage that results from the channeling flow of water hereinbefore mentioned is that as the device is used for treating water the bed of resin tends to become packed and, in so doing, to trap foreign particles. In order to do a thorough job of regenerating a resin bed turbulence is needed in connection with a backwash action to break up the exhausted and packed bed in order to remove the foreign particles and to condition the resin bed for a more efficient cooperation with the brine solution when that is admitted for regenerating the resin bed.

Various means have been employed in attempts to eliminate the channeling. One of these is to provide a bed of gravel below the bed of resin at the point where water emerges from the tube. This of course reduces the resin-holding capacity of the tank. Another approach has been to provide the tube with perforated baffles spaced from one another along the entire length of the tube. Still another is to form the lower end of the tube to a spear-point configuration, as in the distributor-collector tube of a type known by the name "ERIE." In spite of these efforts the industry has not known a structure that overcomes the channeling effect and that provides the turbulence needed for effective backwash agitation of the resin bed.

SUMMARY OF THE INVENTION

In accordance with the present invention, there is added to a conventionally slotted collector-distributor tube a circular baffle member. The baffle has a diameter that is a a maximum consistent with easy insertion into the tank from the top through the aperture in the top of generally conventional or standard water softener tanks. The upper surface of the baffle is frusto-conical and slots conformed to concentric circles that are coaxial with the tube extend through the baffle member. At the outer edge of the frusto-conical surface there is a depending skirt, and the interior of the conical portion is provided with water deflecting surfaces, some of which are generally normal to the axis of the tube and others are oblique to the axis of the tube.

Preferably the perforations in the tube are in the form of slots extending circumferentially of the tube in planes generally normal to the axis of the tube and the baffle member is positioned so that the bottom of the skirt of the baffle member generally coincides with or extends just below the uppermost ring of slots in the tube.

With this baffle, water entering the tank through the tube and emerging from the slots in the bottom flows in a variety of paths. A portion flows outwardly directly from the lower slots in the tube toward and upwardly along the sides of the tank. A substantial portion, however, flows upwardly to the interior of the baffle. Some of that which enters the baffle flows through the circular arrays of slots and upwardly. A substantial portion however strikes the various deflecting surfaces and is deflected back downwardly and outwardly and then upwardly so that there is a fairly uniform distribution of water rising through the bed of ion-exchange resin.

When the flow of water is reversed, as during a softening cycle, the water under this circumstance entering the tank at the top flowing downwardly through the bed of resin and being collected and drawn off by the tube, the portion of the water that tends to channel along the tube encounters the frusto-conical surface of the baffle, some of it passing through the circular arrays of slots in the baffle but a substantial portion striking the frusto-conical surface and being deflected upwardly and outwardly toward the wall of the tank and then downwardly and into the slots in the lower end of the tube.

BRIEF DESCRIPTION OF THE DRAWINGS

For a complete understanding of the invention, reference may be had to the following detailed description to be interpreted in the light of the accompanying drawings wherein.

DETAILED DESCRIPTION

Figure 1:
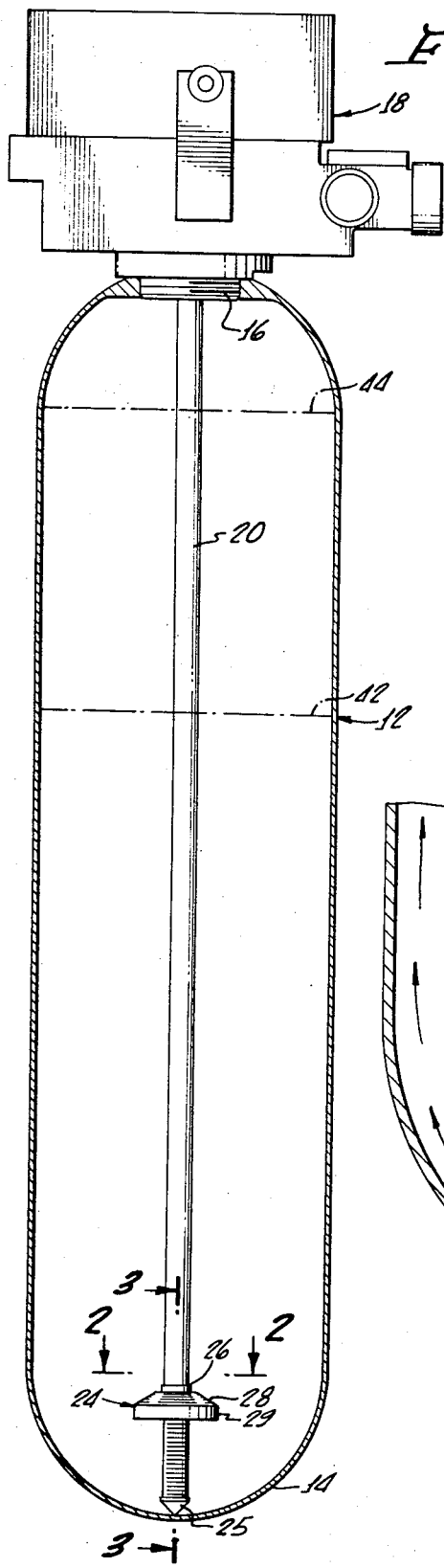
FIG. 1 is a vertical sectional view through a water softener tank showing the collector-distributor tube with a deflector in accordance with the preferred embodiment of the invention mounted thereon, the water flow control unit at the top of the tank being shown in elevation.

Referring now to the drawings and particularly to FIG. 1 the reference numeral 12 designates a conventional form of water softener tank having a hemispherical lower end 14 and a threaded aperture at the upper end to receive the threaded base 16 of a control unit designated generally by the reference numeral 18 which, in accordance with conventional practices has fittings for the admission and withdrawal of water, both for softening and backwash functions, for the admission and withdrawal of brine for the regenerating function, together with valves and valve control mechanism for sequencing the various functions. A control unit of this type is shown schematically in my U.S. Pat. No. 3,557,827 granted Jan. 26, 1971. The control unit 18 has associated with it a collector-distributor tube, designated herein by the reference numeral 20, extending the length of the tank 12. As is well known the association of the collector-distributor with the control unit at the top of the water softener tank is such that water may be admitted into the tank through the tube 20 or drawn off from the tank through the tube, dependent upon the operating conditions at any given time, whether those conditions are treating raw water to effect a softening through the association of the water with the bed of ion-exchange resin, the backwashing of the bed of resin that has become exhausted and is to be regenerated, or the admission and withdrawal of brine for the purpose of regenerating the resin.

Figure 3:
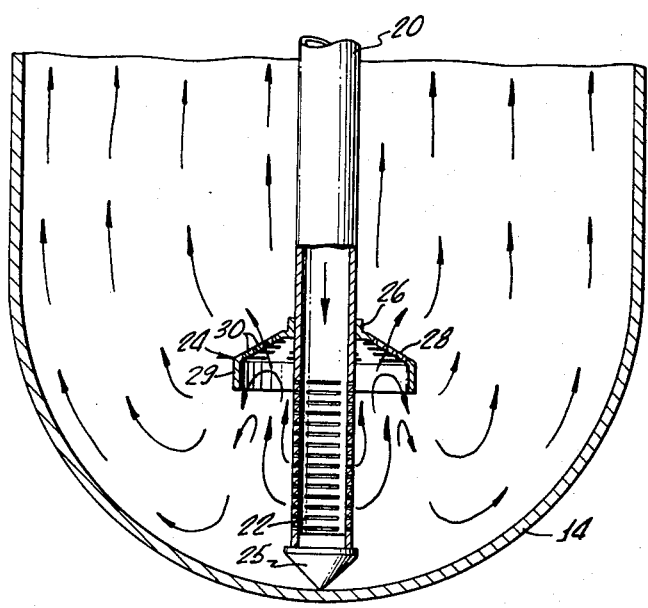
FIG. 3 is an enlarged fragmentary sectional view of the lower portion of the tank, the tube and the deflector mounted thereon, being a sectional view taken generally on the line 3—3 of FIG. 1.
Figure 4:
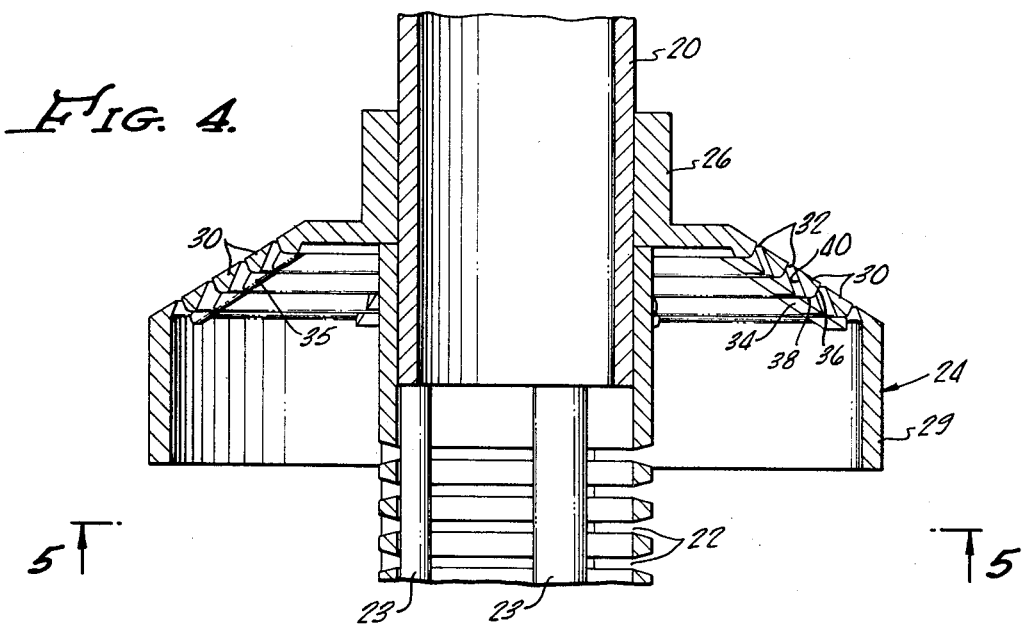
FIG. 4 is a still more enlarged sectional view of the deflector to show in greater detail the interior thereof.

As shown in FIGS. 1, 3 and 4 the tube 20 is provided with perforations at its lower end through which water may enter or be drawn off from the tank 12. In the specific arrangement shown in the drawings the perforations are in the form of slots 22 in the wall of the tube extending circumferentially of the tube and are in the form arcs of circles that are coaxial with the tube 20. They subtend the angles between the ribs 23, four being shown, extending longitudinally of the tube 20 on the inside of the wall of the tube, and accordingly each slot subtends an angle slightly less than 90°. The slots could, however, consist of pairs of aligned slots each slot of a pair subtending an angle somewhat less than 180° or they might be in sets of three slots, each slot subtending an angle of less than 120°. There would, in those cases be two or three, respectively, of the ribs 23. The lengths of the slots and the length of the lower end of the tube 20 that is slotted are matters of choice. One general statement may be made concerning the extent to which the slots vent the tube and this is that the total area of the slots shall exceed the cross-sectional area of the tube in order that the flow of water through the tube in either direction shall not be impeded at the slotted end of the tube. The slots in the lower end of the tube should be so dimensioned as to preclude entry of the granules of resin into the tube.

It is usual to provide a pointed closed end 25 at the bottom of the tube 20 to facilitate the installation of a tube into a tank into which the bed of granular resin has already been introduced. Such an end has been shown in the drawings hereof by way of indicating that a deflector or baffle in accordance with the present invention may be added to a conventional collector-distributor tube. It will become apparent, however, the installation, into a tank standing in its normal vertical position and already containing its charge of resin, of a collector-distributor tube fitted with a baffle as disclosed herein, will be precluded by the resin.

Figure 2:
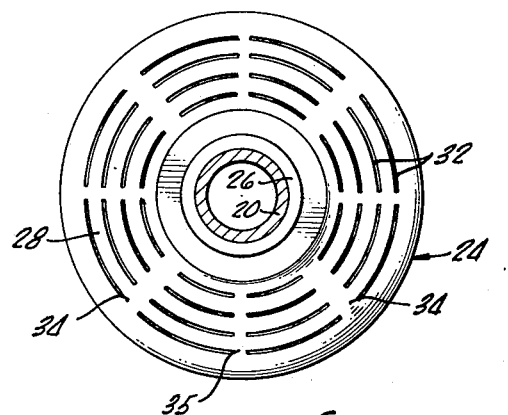
FIG. 2 is a top view of the deflector taken generally on the line 2—2 of FIG. 1.
Figure 5:
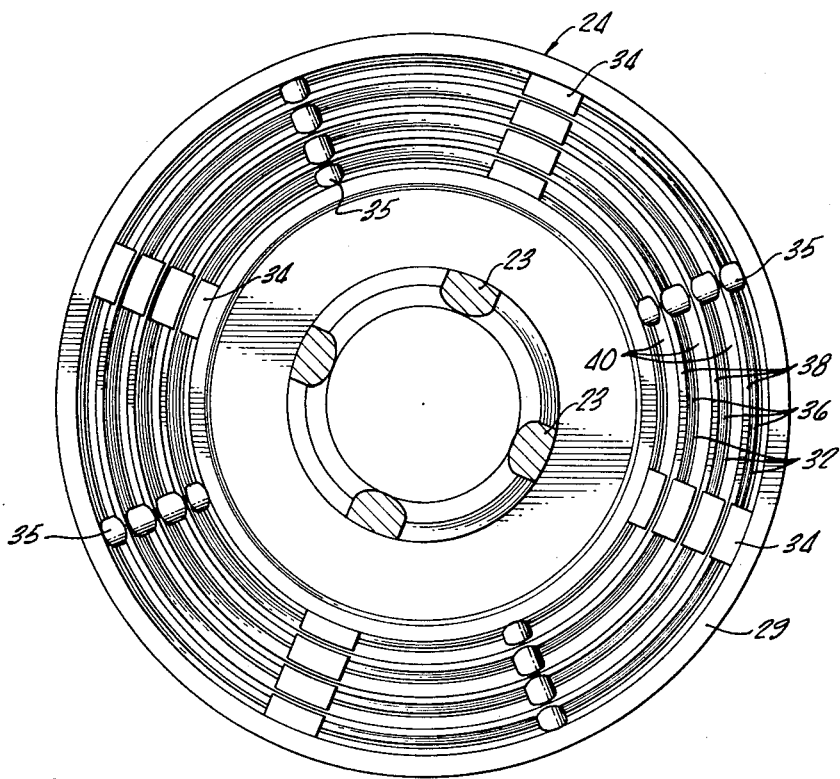
FIG. 5 is a view looking into the interior of the deflector, being generally a view taken on the line 5—5 of FIG. 4.

The baffle or deflector that comprises the water softener improvement disclosed herein is shown in FIG. 2 as viewed from the top, in FIGS. 3 and 4 in section, the latter being an enlarged section, and in FIG. 5 viewed from beneath the deflector, and is designated generally by the reference numeral 24. It is preferably molded from plastic and high density linear polyethylene is a suitable substance from which to mold the deflector 24. Viewed from the outside, the deflector 24 is comprised of a collar portion 26, an upright frusto-conical body portion 28 and a skirt portion 29. The internal diameter of the collar is substantially the same as the external diameter of the tube 20, to permit the deflector to receive the tube 20 and to be placed in the desired position relative to the upper end of the row of slots 22 in the tube 20 by sliding the deflector along the tube.

Preferably the tube 20 is of plastic, and a material of which the deflector 24 is made is satisfactory for this purpose. The deflector 24 is secured to the tube 20 in the desired position by cementing. If desired, the cementing may be accomplished by a solvent which will soften the external surface of the tube 20, and the upper end of the collar 26 or the inside of the deflector 24 adjacent to the surface of the tube 20, or both as a result of which a softening and a fusion of the two will occur.

The outer or upper surface of the frusto-conical portion of the deflector 24 is smooth and the slope is gentle rather than steep. The principal function of the upper surface of the deflector 24 is to serve as a deflecting barrier for water entering the tank from the top and flowing downwardly through the bed of resin. The portion of the water that tends to channel downwardly in close proximity to the tube 20 will, except for slots 32 in the frusto-conical surface the purpose of which will be described hereinafter, be bounced or reflected back upwardly and outwardly, with some flowing downwardly along the surface of the frusto-conical surface and outwardly, in order to accomplish a spreading of the water outwardly toward the wall of the tank 12 before the water finds its way into the slots 22 to be drawn off through the tube 20, and thereby to subject greater portions of the bed of resin to flow of water in the lower portions of the tank 20.

Referring now to FIGS. 3 and 4, and more particularly to the latter because it is an enlarged view, it will be seen that the interior of the conical portion of the deflector 24 is not a smooth conical surface but is instead a plurality of arcuate ridges 30. Between the ridges 30 the conical portion of the deflector 24 is perforated in narrow arcuate slots 32 arranged in concentric circles that are co-axial with the deflector member 24. In the specific embodiment of the invention shown in the drawings the conical portion of the deflector has four principal radially extending ribs 34 in quadrature, and four minor radially extending ribs 35 bisecting the angles between any two principal ribs 34. In FIG. 2, which is a top view of the deflector 24 the ribs 34 and 35 are seen as discontinuities in the slots 32, the slots therefore subtending an angle of somewhat less than 45°. It will be understood that the specifically disclosed number of ribs is not greatly significant. As in the case of the slots and ribs in the tube 20, the number of ribs might be reduced and the angles subtended by the slots increased, consistent with adequate rigidity of the deflector 24.

As is seen in FIG. 4 the ridges 30 are the lands between adjacent slots and present three faces 36, 38 and 40 toward the open end, which is the skirted end, of the deflector 24. Remembering that the ridges are arcuate, but looking at a cross section of a ridge in order to see how the surfaces are disposed, the surface 36, which is one of the sides of the slot 32, is generally normal to the outer conical surface of the deflector. The surface 38, which intersects the surface 36 is generally conformed to a plane normal to the axis of the deflector 24. The surface 40, which intersects the surface 38 does so in an obtuse angle and also forms a side of a slot 32, intersecting with the conical surface of the deflector in an acute angle. The intersections of the surfaces 36 and 38 are also obtuse angles of substantially the same magnitude as the angle of intersection of the surfaces 40 and 38. It results from this geometrical configuration that the surfaces 38 face downwardly toward the skirted open end of the deflector 24 and are stepped downwardly progressively toward the skirt 29; the surfaces 36 face the skirt 29, or an upward projection of it, at an angle opening downwardly toward the open end of the deflector 24; and, the surfaces 40 face the tube 20 at an angle opening downwardly.

It follows from the geometry of the ridges, as may be seen in FIG. 4, that the two walls 36 and 40 defining a slot 32 are convergent upwardly, and in one embodiment of the invention the width of the slots as they emerge at the upper surface of the deflector is of the order of 0.025 of an inch. It is the intent of the structure that a small percentage of the water emerging from the slots 22 in the tube 20 when water is being admitted into the tank through that tube shall pass upwardly through the slots 32, but that most of the water shall be deflected downwardly.

It is assumed that water rising upwardly from the slots 22 into the interior of the deflector 24 and striking the surfaces 40 will be deflected or bounced generally obliquely downwardly and toward the tube 20, that water rising into the interior of the deflector 24 and striking the surfaces 36 will be deflected or bounced obliquely downwardly and toward the inner surface of the skirt 29, and that water rising from below and striking the surfaces 38 will tend to be deflected back downwardly. Actually, of course, the turbulence at the bottom of the deflector 24 as the water rushes out of the slots 22 in the tube 20 will cause water to impinge upon the surfaces 36, 38 and 40 from a variety of angles and accordingly it will be deflected downwardly in many angular directions relative to the surfaces 36, 38 and 40. The net effect of a deflector having the interior arranged as shown and described herein is to produce a flow of water in pattern represented by the arrows in FIG. 3. Some will rise into the deflector 24 and pass through the slots 32 so that it will flow upwardly in relatively close proximity to the tube 20, more will be revertively directed when it enters the interior of the deflector 24, some will tend to rise but be prevented from actually entering the deflector 24 by water that has entered and been revertively deflected and some will flow directly outwardly from the slots 22 because it emerges from the slots a sufficient distance below the deflector 24 to be prevented from entering the deflector. The distribution will, as indicated, be general and relatively uniform throughout the hemispherical lower end of the tank 12, and more efficient operation of the tank in its different types of cycles hereinbefore mentioned will result.

In FIG. 1 the dotted line 42 represents the location of the top of the bed of ion-exchange resin generally provided in water softeners when the bed is in its settled condition with no flow of water through the tank to produce turbulence. When water is admitted through the tube 20 and emerges from the slots 22, as in the case of a backwash operation, turbulence produced by the flow of water from the slots 22 at the bottom of the tank causes the level of the bed to rise. In actual operation of a tank equipped with a deflector 24 the level of the resin rose due to turbulence at the bottom of the tank a distance approximately equal to the diameter of the tank, and this level is indicated by the dotted line 44. In comparable operation of the same tank at the same fluid pressures without any deflector on the tube 20, and also with a collector-distributor tube of the type known by the name "ERIE," the rise in the level of the bed of resin was considerably less than the rise achieved by the use of a deflector of the type shown and described herein. It is beneficial to achieve as great a rise in the level of the bed of resin as possible, because there is a better separation of the particles, and a more intimate association of the water with individual particles so that a more effective cleansing operation is achieved in the case of the backwash cycle and a better regeneration of the resin is achieved in the case of the brine cycle.

In order to achieve the water flow pattern described above and shown in FIG. 3 the deflector 24 is secured to the tube 20 at a point that places the bottom of the skirt substantially in alignment with the uppermost set of slots 22 in the tube 20. If the deflector were to be positioned nearer the lower end of the tube, so that it obscures several sets of slots 22, the lateral outflow of water from the slots thus obscured might interfere with and detrimentally modify the revertive deflection of water by the deflector 24. If the deflector were to be positioned with the bottom of the skirt appreciably above the uppermost set of slots 22, its efficiency to produce a lifting of the bed of resin when the tube 20 is functioning as a distributor would be diminished as well as its anti-channeling property, it being remembered that the diameter of the deflector 24 cannot exceed the diameter of the aperture in the tank through which the collector-distributor tube with the attached deflector is installed.

The arrangement of the slots 32 in the deflector 24 in patterns of concentric circles rather than in some other pattern, such as radial slots, is preferred. The slots increase in length progressively outwardly from the innermost ring of slots, and greater quantities of water may pass through the rings of slots as the radial distance of slots from the tube 20 increases. Radial slots of equal length and uniform width would pass equal quantities of water and would not proportionally accommodate the area of water impinging on the inside of the conical portion of the deflector, because that area increases as the square of the radius. Nor would it be feasible to provide radial slots having widths increasing outwardly, because it is desirable to preclude the passage of granules of resin through the slots. The importance of proportioning the slots to the area of the head of water confronting the slots is that a greater volume of water becomes available to pass upwardly above the deflector, the water spreads more uniformly through the bed of resin, and the tendency toward channeling along the tube 20 is diminished.

I claim:

1. A deflector mountable on the collector-distributor tube of a water softener device adjacent to the collector-distributor orifices in said tube which comprises:
   a collar portion dimensioned to surround the tube in secured engagement therewith;
   a body portion presenting a surface sloping outwardly and downwardly from the collar portion and having apertures to accommodate a flow of water through the body portion; and
   a skirt portion depending from said body portion.

2. A deflector as set forth in claim 1 wherein the apertures are disposed in locations to afford passage through the body portion of increased volumes of water at increased distances outwardly from the collar portion of the deflector.

3. A deflector as set forth in claim 1 wherein the sloping surface of the body portion is a frusto-conical surface and each aperture is a slot conformed to an arc of a circle having as its center the axis of the frusto-conical surface.

4. A deflector as set forth in claim 3 wherein the slots are conformed to arcs of concentric circles having as their center the axis of the frusto-conical surface.

5. A deflector as set forth in claim 4 wherein the slots of successive concentric circles in a direction radially of the frusto-conical surface subtend the same angle and accordingly are of progressively greater length.

6. A deflector as set forth in claim 4 wherein the walls defining each slot are convergent in a direction outwardly from the inside of the body portion of the deflector to the frusto-conical surface.

7. A deflector as set forth in claim 4 wherein the land separating two adjacent slots in a direction radially of the frusto-conical surface is defined interiorly of the body portion of the deflector by a wall generally normal to the frusto-conical surface at any point along one of the two slots and a wall intersecting the frusto-conical surface in an acute angle at any point along the other of the two slots.

8. A deflector as set forth in claim 7 wherein the two walls defining a land separating two adjacent slots terminate interiorly of the body portion deflector in intersection with a surface disposed in a plane normal to the axis of the frusto-conical surface.

9. A deflector in accordance with claim 8 wherein the angles of intersection of the two walls of the land with the surface at which they terminate are substantially equal.

10. A deflector as set forth in claim 8 wherein the lands are substantially identical in cross section and the surfaces defining them interiorly of the body portion are disposed in stepped alignment outwardly from the tube generally corresponding to the slope of the frusto-conical surface.

11. An improved water softener device comprising a pressure vessel, filled to a predetermined level with ion-exchange material in granular form and having a collector-distributor tube penetrating the ion-exchange material and apertured over a portion of its penetrating length to selectively and alternatively discharge and collect water, wherein the improvement comprises:
   a deflector mounted on the tube in a position adjacent to the apertured portion of the tube and comprising an apertured frusto-conical portion and a cylindrical skirt portion.

12. An improved water softener device as set forth in claim 11 wherein the apex of the frusto-conical portion of the deflector faces away from the apertured portion of the tube and the skirt portion depends from the flaring end of the frusto-conical portion.

13. An improved water softener device as set forth in claim 11 wherein the apertures in the frusto-conical portion of the deflector are slots arrayed in concentric circles and thereby afford increased flow-through capacity as their distance radially from the tube increases.

14. An improved water softener device as set forth in claim 13 wherein the width of the slots in relation to the granule size of the ion-exchange material precludes passage of the granules through the slots.

15. An improved water softener device as set forth in claim 11 wherein the interior of the frusto-conical portion of the deflector is provided with rings of water deflecting surfaces to revertively deflect a portion of the water entering the deflector from the apertures in the tube.

16. An improved water softener device as set forth in claim 15 wherein each of said rings includes a plurality of surfaces facing in different directions.

17. An improved water softener device as set forth in claim 16 wherein one surface of each ring is normal to the axis of the frusto-conical portion of the deflector, another surface intersects said one surface in an obtuse angle and faces toward said axis, and still another surface intersects said one surface in an obtuse angle and faces away from said axis.

18. An improved water softener device as set forth in claim 15 wherein the rings of water deflecting surfaces are the lands separating two slots adjacent one another in a direction radially of the frusto-conical portion of the deflector.

19. An improved water softener device as set forth in claim 15 wherein the rings of water deflecting surfaces are stepped progressively on the interior of said frusto-conical portion of said deflector in correspondence with the slope of the exterior surface of said frusto-conical portion.

20. An improved water softener device as set forth in claim 15 wherein the deflector is mounted on the collector-distributor tube in a position to present the free end of the skirt portion of the deflector generally in registry with the end of the apertured portion of the tube farthest from the penetrating end of the tube.

21. A circular deflector mountable on the collector-distributor tube of a water softener device which comprises:

a collar portion dimensioned to surround the tube in secured engagement therewith;

a body portion having an upright frusto-conical surface presented toward the collar portion and having slots extending through the body portion and arrayed in a pattern of concentric circles coaxial with said deflector;

a plurality of surfaces intersecting on the opposite face of said body portion from the frusto-conical surface to define lands between adjacent circles of slots including as a component of each land one surface generally normal to the axis of the deflector and two surfaces intersecting said one surface in obtuse angles; and an annular skirt portion depending from the flaring end of the frusto-conical surface of said body portion.

* * * * *